United States Patent [19]

Ogata et al.

[11] Patent Number: 5,313,559
[45] Date of Patent: May 17, 1994

[54] METHOD OF AND SYSTEM FOR CONTROLLING LEARNING IN NEURAL NETWORK

[75] Inventors: Hisao Ogata, Kokubunji; Hiroshi Sakou, Shiki; Masahiro Abe, Iruma; Junichi Higashino, Kodaira, all of Japan

[73] Assignee: Hitachi, Ltd., Tokyo, Japan

[21] Appl. No.: 833,127

[22] Filed: Feb. 10, 1992

[30] Foreign Application Priority Data

Feb. 15, 1991 [JP] Japan .................. 3-042957

[51] Int. Cl.$^5$ ............................................. G06F 15/18
[52] U.S. Cl. ......................................... 395/23; 395/76
[58] Field of Search ................................... 395/23, 76

[56] References Cited

U.S. PATENT DOCUMENTS

| | | | |
|---|---|---|---|
| 4,530,054 | 7/1985 | Hamstra et al. | 395/550 |
| 4,823,310 | 4/1989 | Grand | 395/600 |
| 4,941,122 | 7/1990 | Weideman | 364/807 |
| 5,033,006 | 7/1991 | Ishizuka et al. | 364/513 |
| 5,088,034 | 2/1992 | Ihara et al. | 364/DIG. 1 |
| 5,121,467 | 6/1992 | Skeirik | 395/11 |
| 5,142,665 | 8/1992 | Brgus | 395/21 |
| 5,168,550 | 12/1992 | Sakaue et al. | 395/23 |

FOREIGN PATENT DOCUMENTS

| | | |
|---|---|---|
| 2-231670 | 9/1990 | Japan . |
| 2-277180 | 11/1990 | Japan . |
| 3-18964 | 1/1991 | Japan . |
| 3-36659 | 2/1991 | Japan . |
| 4-60752 | 2/1992 | Japan . |

OTHER PUBLICATIONS

Caudill, "Neural Network Training Tips and Techniques", AI Expert, Jan. 1991, pp. 56–61.

Vanderplaats, "Numerical Optimization Techniques for Emgineering Design," McGraw Hill, 1984.

Nievergett et al, "Sites, Modes, and Trails: Telling the User of an Interactive System Where He is, What He Can Do, and How He Can Get to Places", in Readings in Human-Computer Interaction: A Multidisciplinary Approach, Baecker et al eds, 1987, pp. 438–441.

Luenberger, "Linear and NonLinear Programming", Second Edition, Addison-Wesley, 1984, pp. 191–192, 382–383.

McClelland et al., Explorations in Parallel Distributed Processing, MIT Press, 1988, 2, 3, 121–152, 245–262, 303, 304.

Hillman, D., "Software Review-Neuro Shell," AI Expert, Sep. 1990, 61, 62, 64.

Takingi et al., "Fast Learning Algorithm for Artificial Neural Network Using Non-Linear Optimization Method," IEEE Spring Conf., 1989, 7-305-7-306.

*Primary Examiner*—Michael R. Fleming
*Assistant Examiner*—Robert W. Downs
*Attorney, Agent, or Firm*—Fay, Sharpe, Beall, Fagan, Minnich & McKee

[57] ABSTRACT

A learning control method reduces overall learning time by displaying data related to an appropriate determination of learning protraction and a proper restoring method. Prior to initiating the learning, the user is inquired about the current problem and a problem data set representing items associated with the problem is obtained. Evaluation data indicating a state of learning obtained during the learning on the current problem is sequentially stored and displayed. When there is a high possibility of learning protraction during the learning, a message informing the user is displayed. When the learning is stopped by the user in this case, the problem data set and evaluation data set are stored. Then, a list of restoring methods is displayed and a particular restoring method is selected by the user once the learning is stopped. The learning is restarted on the current problem in accordance with the selected restoring method.

15 Claims, 18 Drawing Sheets

FIG. 7

| | |
|---|---|
| 44 — | NAME OF PROBLEM TO BE LEARNED (SUCH AS CHARACTER RECOGNITION, SPEECH RECOGNITION, SIGN INQUIRY, AND DATA COMPRESSION) |

45 — KIND AND CHARACTERISTICS OF LEARNING PATTERN DATA

- NUMBER OF NEURONS IN INPUT AND OUTPUT LAYERS
- NUMBER OF PATTERNS OF LEARNING PATTERN DATA
- NUMBER OF INPUT SIGNAL DATA ASSOCIATED WITH ONE TEACHER SIGNAL DATA
- MEAN VALUES OF ELEMENTS OF EACH DIMENSION OF LEARNING PATTERN DATA
- STANDARD DEVIATIONS OF ELEMENTS OF EACH DIMENSION OF LEARNING PATTERN DATA
- DATA INDICATING WHICH OF BINARY DATA AND ANALOG DATA LEARNING PATTERN DATA IS
- DATA INDICATING WETHER LEARNING PATTERN DATA INCLUDES NOISE

46 — STRUCTURE OF NEURAL NETWORK

- NUMBER OF INTERMEDIATE LAYERS
- NUMBER OF NEURONS IN EACH INTERMEDIATE LAYER
- NUMBER OF SYNAPSES CONNECTED TO EACH NEURON
- NUMBERS OF NEURONS IN PREVIOUS LAYER CONNECTED TO EACH NEURON

47 — INITIAL SETTING UPON LEARNING

- INITIAL WEIGHT PARAMETER
- LEARNING COEFFICIENTS
- MOMENTUM COEFFICIENTS
- COMPLETION CONDITION

FIG. 9

| | 1 | 2 | ..... |
|---|---|---|---|
| 53 | OUTPUT ERROR 1 (ADDED OVER ALL LEARNING PATTERNS) | OUTPUT ERROR 2 | ..... |
| 54 | MEAN VALUE 1 OF NORMS OF THE STEEPEST DESCENT GRADIENT VECTORS (AVERAGED AFTER ADDED OVER ALL LEARNING PATTERNS) | MEAN VALUE 2 OF NORMS OF THE STEEPEST DESCENT GRADIENT VECTORS | ..... |
| 55 | MEAN VALUE 1 OF NORMS OF WEIGHT VECTORS | MEAN VALUE 2 OF NORMS OF WEIGHT VECTORS | ..... |
| 56 | MEAN VALUE 1 OF DERIVATIVE VALUES OF SIGMOID FUNCTION | MEAN VALUE 2 OF DERIVATIVE VALUES OF SIGMOID FUNCTION | ..... |

FIG. 10

| | |
|---|---|
| 61 | REFERENCE VALUE FOR OUTPUT ERROR 53 |
| 62 | REFERENCE VALUE FOR MEAN VALUE 54 OF NORMS OF THE STEEPEST DESCENT GRADIENT VECTORS |
| 63 | REFERENCE VALUE FOR MEAN VALUE 55 OF NORM OF WEIGHT VECTOR |
| 64 | REFERENCE VALUE FOR MEAN VALUE 56 OF DIFFERENTIAL VALUES OF SIGMOID FUNCTION |

F I G. 12
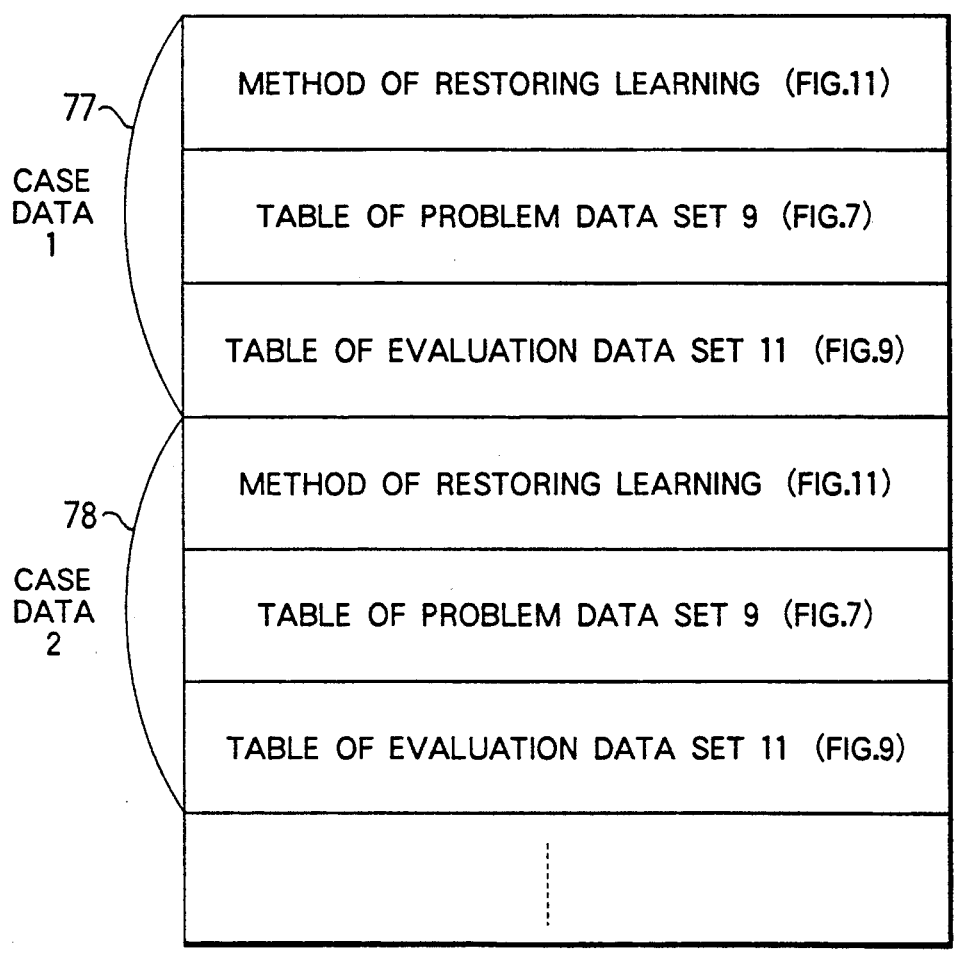

$$f(\text{net}) = \frac{1}{1 + e^{-\text{net}}}, \quad \text{net} = w \cdot 0$$

DEPENDENCY OF SIGMOID FUNCTION UPON w $$\frac{df}{dnet} = \frac{e^{-net}}{(1 + e^{-net})^2}$$

METHOD OF AND SYSTEM FOR CONTROLLING LEARNING IN NEURAL NETWORK

BACKGROUND OF THE INVENTION

1. Field of the Invention

The present invention relates to a method of and a system for controlling learning of learning pattern data in a neural network data in pattern recognition, data compression, and the like.

2. Description of Related Art

A neural network is a simplified model representing the structure of a human brain and in the neural network neurons are coupled with each other via synapses, each of which transmits a signal in a single direction. By adjusting a resistance of each synapse, namely, a weight thereof, it is possible to accomplish various kinds of processing. Each of outputs from other neurons to a current neuron is weighted in accordance with a weight assigned to a corresponding synapse and the current neuron applies transformation of a non-linear response function to a sum of the weighted inputs to output a result of the transformation to a next neuron as a neuron output. That is, the learning of the neural network means adjusting weights of synapses.

The neural networks are structurally classified into two types, i.e., an interconnecting type and a multilayer type, which are respectively suitable for an optimization problem and processing such as a pattern recognition.

When a multilayer type of neural network is employed in pattern recognition and/or data compression, in order for the network to produce an appropriate answer to an unknown problem, it is necessary to cause the network to learn past cases in accordance with input and teacher signal patterns of learning pattern data. An optimization method for this purpose is called a back propagation method. This method has been discussed in a reference, e.g., Rumelhart D. E., Hinton G. E., Williams R. J., "Parallel Distributed Processing: Exploration in the Microstructure of Congnition", Volume I; Foundation CHAPTER 8, pp. 322–328, the MIT Press Cambridge, Mass. (1986). In this method, by utilizing a non-decreasing continuous function such as a sigmoid function as a non-linear response function of a neuron and by updating weights of synapses in accordance with the following equation (1), an output error of the network is gradually reduced.

$$dw/dt = -\partial E / \partial w \quad (1)$$

w: Weight
E: Error of network output pattern
t: Time

The method will now be described in detail with reference to FIG. 6. Learning pattern data 10 generally includes input signal data and teacher signal data of the numbers of (number of neurons of input layer)×(number of patterns) and (number of neurons of output layer)×(number of patterns), respectively. When an input signal pattern is inputted to the input layer of the neural network, an error between a pattern outputted from the output layer thereof and a teacher signal patter corresponding to the input signal pattern is calculated and used for the learning in the neural network.

In a step 37, an input signal pattern p of the learning pattern data 10 is supplied to neurons of the input layer. In a step 38, according to the following equations (2) and (3), the input signal pattern is sequentially propagated toward neurons of the output layer to finally attain an output pattern from neurons of the output layer.

$$O_{pi}^l = f(net_{pi}^l) = 1/(1 + \exp(-net_{pi}^l)) \quad (2)$$

$$net_{pi}^l = \sum_{j=1}^{n_l-1} W_{ij}^l \cdot O_j^{l-1} + \theta_i^l \quad (3)$$

$O_{pi}^l$: Output from i-th neuron of layer $l$ on reception of input signal pattern p $net_{pi}^l$: Total of inputs to i-th neuron of layer $l$ on reception of input signal pattern p $W_{ij}^l$: Weight from j-th neuron of layer $l-1$ to i-th neuron of layer $l$ $\theta_i^l$: Offset of i-th neuron of layer $l$
$n_l$: Number of neurons of layer $l$
$f$: Sigmoid function As can be understood from the above equations, in order to obtain a sum of inputs to a neuron, an inner product between an output from a previous neuron and a weight of a synapse corresponding to the previous neuron is computed for each previous neuron. In the following description, consider a vector having, as elements thereof, all weights respectively assigned to synapses connected to the neuron and call such a vector a weight vector and also call a magnitude of the weight vector a norm.

In a step 39, an output error Ep for the pattern p is calculated in accordance with the following equation (4) from an teacher signal pattern p for the input signal pattern p and the output pattern from the output layer neurons calculated in the step 38.

$$EP = \frac{1}{2} \sum_{i=1}^{n_k} (t_{pi} - O_{pi}^k) \quad (4)$$

$O_{pi}^k$: Output from i-th neuron of layer k on reception of input signal pattern p $t_{pi}$: Output signal pattern of input signal pattern p for i-th neuron $n_k$: Number of neurons of output layer k In a step 40, a gradient of the error E for each weight W of each neuron is calculated according to the following equations (5) and (6).

$$-\frac{\partial E}{\partial W_{ij}^l} = \delta_i^l O_j^{l-1} \quad (5)$$

$$\delta_i^l = \sum_{m=1}^{n_l} \delta_{pm}^{l+1} W_{mi}^l f'(net_{pi}^l) \quad (l \neq k) \quad (6)$$

$$(t_{pi} - O_{pi}^k) f'(net_{pi}^l) \quad (l = k)$$

A current correction of a concerned weight is determined from the gradient of error and a previous correction thereof by use of the following equation (7).

$$\Delta W_{ij}^l = -\eta \frac{\partial E}{\partial W_{ij}^l}(n) + \alpha \Delta W_{ij}^l(n-1) \quad (7)$$

$\eta$: Learning coefficient
$\alpha$: Momentum coefficient

Here, the second term of the right side of equation (7) is called a momentum term and is added thereto in accordance with experiences to accelerate the learning.

In a step 41, the learning pattern is updated for preparation of the subsequent learning. In a step 42, a check is made to determine whether or not the learning has been completed over all the patterns of the learning pattern data 10. If all the patterns are completed, the control is passed to a step 43; otherwise, the control returns to the step 37 to repeatedly perform the learning. In a step 43, the number of iterations of the learning is updated by adding "1" thereto.

The above steps are repeatedly carried out until the output error becomes to be equal to or less than a predetermined upper-limit preset as a criterion of the completion of learning.

Description has been given of the principle of learning accomplished in the back propagation method. On the other hand, the above learning is attended with the following two problems: (1) Protraction of learning due to an excessive increase of weights and (2) Local minimum.

First, the problem (1) will be described. In the step 40, in order to obtain the gradient of the error for a weight, $-\sigma E/\sigma W$, a derivative f' of the sigmoid function f must be multiplied by the output O. When a sum of inputs to the neuron becomes to be excessively large, the derivative f' enters a flat region of its function and hence becomes to be very small. As a result, the gradient of error is minimized and hence the learning rarely advances in this situation. The increase in the sum of inputs, which causes the protraction of learning, takes place because of an excessive increase in the norms of the weight vectors of neurons in the learning process. The above phenomenon will be described with reference to FIGS. 15 and 16.

FIG. 15 shows dependency of the sigmoid function upon the weight parameter W. The following equations (8) and (9) indicate that the greater the weight W is, namely, the greater the norms of the weight vectors are, the steeper rising of the function value is in the proximity of $O=0$.

$$f(net) = 1/(1+\exp(-net)) \quad (8)$$

$$net = w \cdot o \quad (9)$$

On the other hand, the value of df/d(net) employed in the learning is quickly reduced when the sum of inputs, net, is increased as shown in FIG. 16. Since the sum of inputs, net, is proportional to the weight W, when the weight W becomes greater, df/d(net) is reduced.

The phenomenon will be further described in detail with reference to FIGS. 17 and 18. These Figures show a state of a neuron having two-dimensional inputs before and after the learning when a linear separation of signals, a and b, is to be performed, respectively. Namely, when the signals, a and b, are inputted to the neuron after completion of the learning, the neuron outputs values of 0.9 and 0.1 for the signals a and b, respectively. The following equations (10) and (11) are used to calculate an output O3 from the neuron.

$$O_3 = f(net) = 1/(1+\exp(-net)) \quad (10)$$

$$net = w_1 \cdot o_1 + w_2 \cdot o_2 + \theta \quad (11)$$

FIG. 17 shows a state of the neuron prior to the learning in which U represents a straight line for net=0, a plane associated with which will be called a separating plane herebelow. In this state, the neuron outputs values 0.6 and 0.4 for the signals a and b, respectively. In order to establish the neuron state shown in FIG. 18 through the learning, it is necessary to rotate the straight line U for separation of the straight line U from the signals a and b to the possible extent. Also it is necessary to increase the norms of weight vectors to steeply raise the sigmoid function. However, if the norms become to be great in this processing before the straight line U is fully rotated, the value of df/d(net) involved in the form of a multiplication in the gradient descent of error is decreased, resulting in substantial protraction of the learning.

Next, description will be given of the problem (2), i.e., the local minimum. The back propagation method is an optimization method using a gradient descent and is also called a mountaineering method. Consequently, when a determination of an optimal solution is carried out according to the error and the gradient descent, the neural network is trapped in a local minimum and hence the learning cannot be completed in some cases.

As a result, in a learning system adopting the conventional back propagation method attended with the problems related to its principle, the overall period of time consumed for the learning is likely to be elongated in many cases from the following reasons:

When it is to be determined whether or not the learning is almost in protraction, the number of iterations of the learning and the output error are generally used. However, a reducing rate of the output error through the back propagation is not uniform and is remarkably altered when the number of iterations is increased. Therefore, it is difficult to appropriately determine the protraction of learning. As a result, in some cases an unsatisfactory result of the learning is obtained in spite of an excessively elongated time period of the learning.

To escape from the learning protraction, there have been known several restoring methods. However, determination materials are not sufficient for which of the methods is to be used. Therefore, an appropriate method cannot be selected in many cases. As a result, the learning cannot be correctly restored from the protraction or the restoration is delayed.

SUMMARY OF THE INVENTION

It is therefore an object of the present invention to provide a method of and a system for controlling learning in a neural network without elongation of the overall learning period of time.

In order to achieve the object above, there is provided a method of controlling leaning in a multilayer neural network including the steps of:

issuing an inquiry about a problem data set of a current problem to a user and storing the problem data set before initiation of the learning;

storing and displaying a set of evaluation data each representing a learning state of the neural network;

when there exists a possibility of protraction of the learning, displaying a message indicating the learning protraction to request the user selection of continuation or interruption of the learning;

when the interruption of learning is selected, storing the evaluation data set and the problem data set;

displaying a list of restoring methods, restoring methods adopted in the past, case data set including a past problem data set and a past evaluation data set to request the user to select one of the restoring methods for the current problem;

storing the selected method, the problem data set and the evaluation data set; and executing the selected restoring method to restart the learning.

The learning protraction takes place as follows. When the norms of weight vectors become to be excessively great in the learning, a sum of inputs to each neuron is increased to enter a flat region of a sigmoid function and hence the derivative thereof becomes to be small, which reduces the gradient descent of error to be used to correct weights. In this situation, since each evaluation data is displayed, the user can understand a state of the network associated with protraction of learning. Moreover, when a judging condition is satisfied, the message informing the high possibility of learning protraction is presented to the user. Namely, the user can recognize the learning protraction at an earlier point of time, thereby avoiding consumption of unnecessary period of time for the learning.

In addition, when the user needs to select a restoring method, the system displays a method of restoring the learning from the protraction, the past restoring methods, the past problem data set and the past evaluation data set. Consequently, the user can reference these data to appropriately judge the state of learning.

As described above, the protraction of learning can be recognized at an earlier stage thereof; moreover, an appropriate restoration method can be executed. As a result, the unnecessary learning is prevented from being executed and hence the overall learning period of time including the restoration period can be minimized, namely, the learning is executed at a higher speed.

BRIEF DESCRIPTION OF THE DRAWINGS

These and other objects and advantages of the present invention will become apparent with reference to the following description and accompanying drawings wherein:

FIG. 7 is a diagram illustratively showing a problem data set of FIG. 2;

FIG. 9 is a diagram showing in detail a table of evaluation data of FIG. 2;

FIG. 10 is a diagram showing a table of reference values to be used to determine possibility of protraction of learning;

FIG. 12 is a diagram showing a table of case data of FIG. 2;

DESCRIPTION OF THE PREFERRED EMBODIMENTS

Referring now to the accompanying drawings, description will be given of a learning control system according to an embodiment of the present invention.

Figure 2:
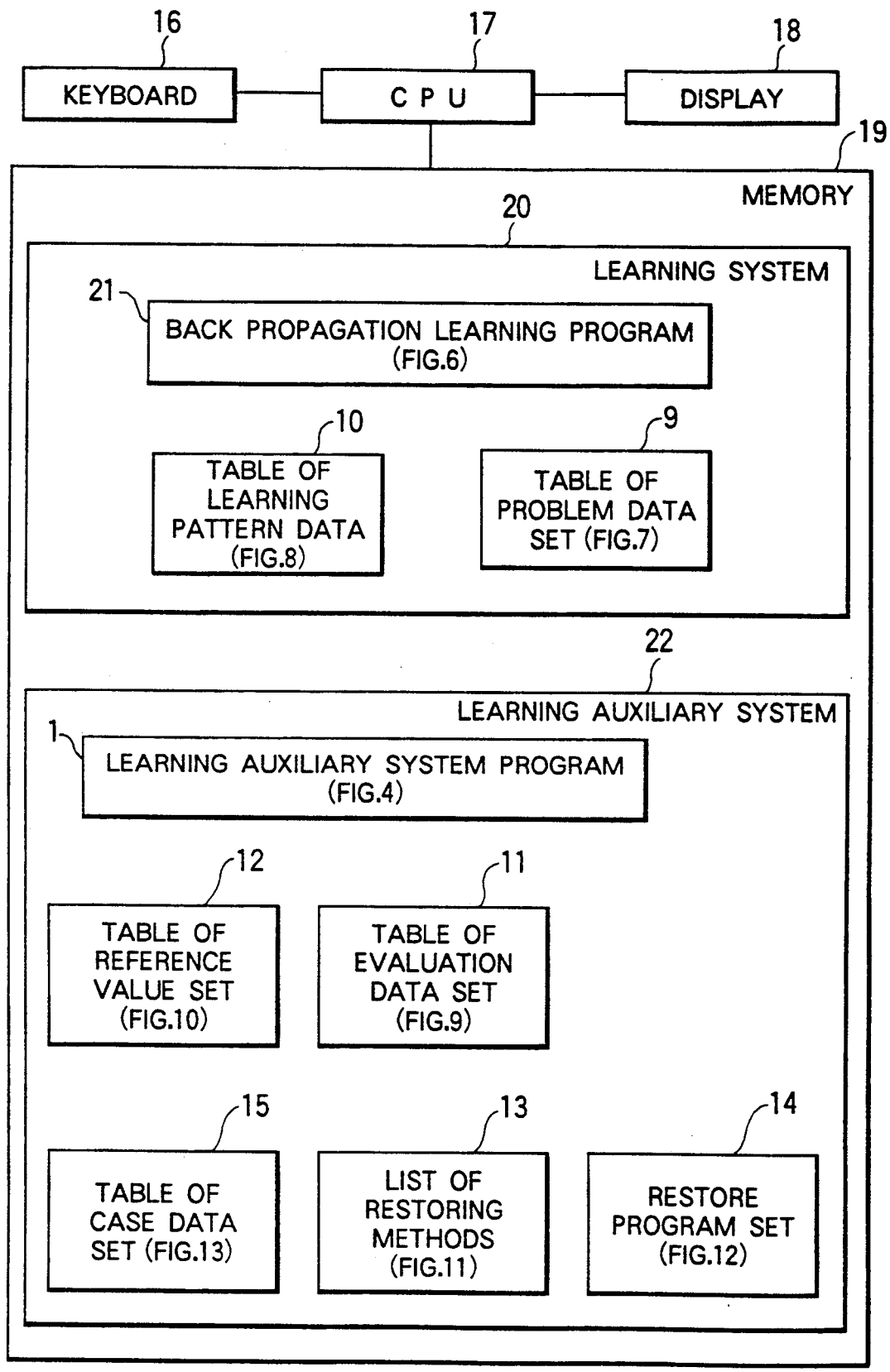
FIG. 2 is a diagram showing the configuration of the learning control system of the present invention.

FIG. 2 shows the overall configuration of the learning control system. The system includes a keyboard 16, a central processing unit (CPU) 17, a display 18, and a memory 19. The memory 19 is constituted of a learning system 20 and a learning auxiliary system 22. The system 20 includes a table of problem data set 9 for storing therein a problem data set which is obtained as a result of inquiry to a user prior to initiation of learning, a table of learning pattern data 10 for storing therein learning pattern data and a back propagation learning program 21. The problem data set 9 includes a name of a problem to be learned, a type and characteristic of learning pattern data, a structure of a neural network, and initial setting data for the learning. The learning pattern data 10 is used for the learning, whereas the program 21 is adopted to perform the learning based on the learning pattern data. The system 22 includes an auxiliary system program 1 for supporting the learning, a table of evaluation data set 11 for storing therein an evaluation data set, a table of reference value set 12 for storing therein a reference value set, a list of restoring methods 13, a restore program set 14, and a table of case data set 15. The evaluation data set 11 is employed to evaluate a state of the learning, the reference value set 12 contains, as a judging condition, reference values for judging the possibility of protraction of learning, the list of restoring methods 13 includes methods of restoring the network from the protraction of learning, the restore program set 14 contains programs associated with the restoring methods of the list 13, and the case data set 15 includes the restoring methods used to restore a network from a past learning protraction a past evaluation data set and a past problem data set upon the past restoring time.

Before explaining the operation of this embodiment, description will be given of various kinds of data sets and the program set.

FIG. 7 shows in detail the problem data set 9 obtained as a result of the inquiry from the learning auxiliary system 22 to the user before initiation of learning. The problem data set 9 includes a name 44 of a problem to be learned, a type and characteristics of the learning pattern data 45, a structure of the neural network 46, and initially setting data upon the learning 47. In a field of the problem name 44, there is stored a name such as character recognition or data compression. A field 45 of the type and characteristic of learning pattern data is used to store the following data:

(1) Number of neurons in input and output layers;
(2) Number of patterns of the learning pattern data;
(3) Number of patterns of the input signal data for one pattern of teacher signal data;
(4) Mean values of elements of each neuron for the learning pattern data;
(5) Standard deviations of elements of each neuron for the learning pattern data;
(6) Data indicating which of binary data and analog data is the learning pattern data; and
(7) Data indicating whether or not the learning pattern data includes noise.

A field of the neural network structure 46 is used to store the following data:

(1) Number of intermediate layers;
(2) Number of neurons in each intermediate layer;
(3) Number of synapses connected to each neuron; and
(4) Numbers of neurons in the previous layer connected to each neuron.

A field of the learning initial setting 47 is employed to store the following data:

(1) Initial weight parameter;
(2) Learning coefficients;
(3) Momentum coefficients; and
(4) Completion condition.

Figure 8A:
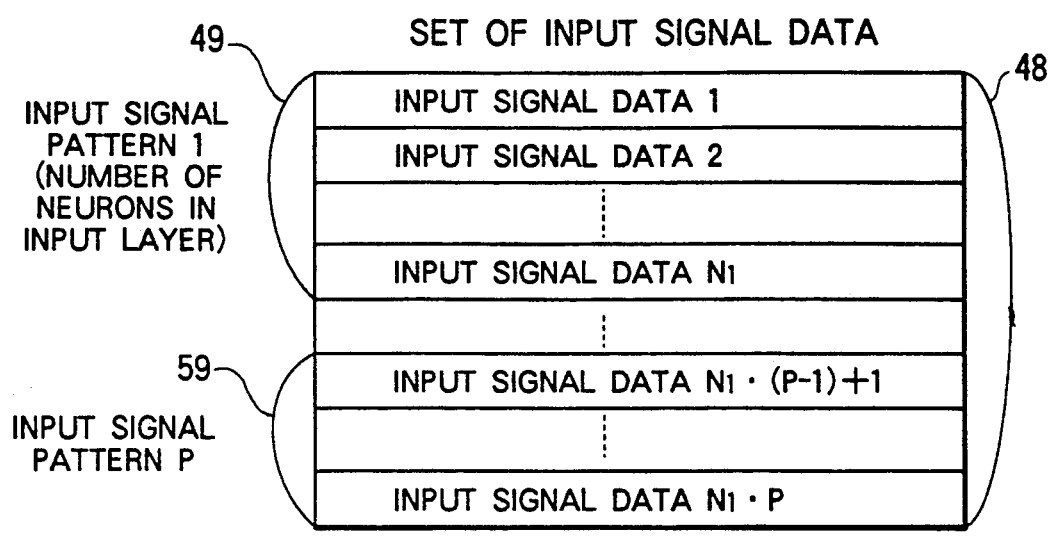
FIGS. 8A and 8B are diagrams respectively showing input signal data and teacher signal data of learning pattern data of FIG. 2.
Figure 8B:
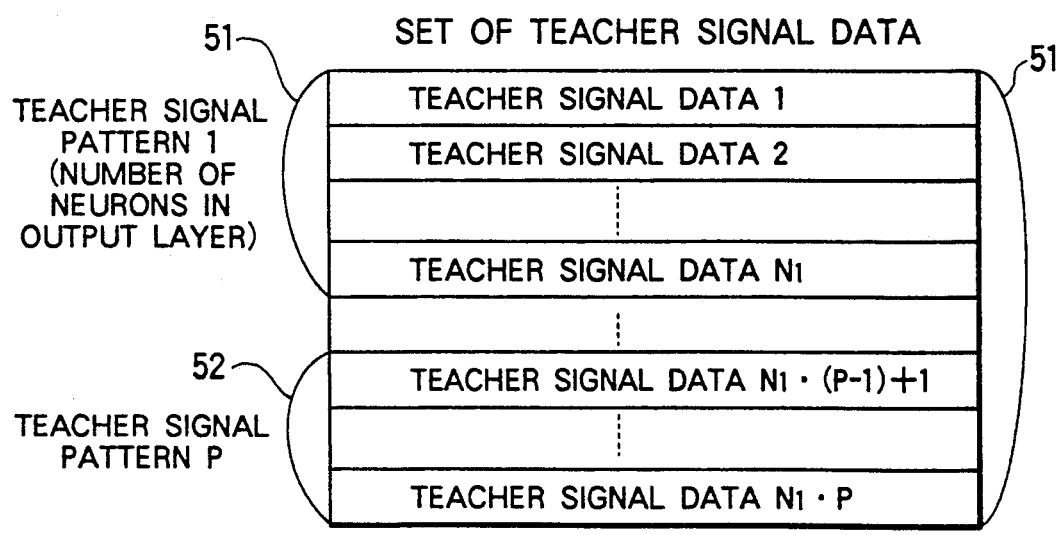

FIGS. 8A and 8B show in detail the learning pattern data 10. The pattern data 10 includes a set of input signal data 48 of (number of neurons of input layer)×(number of patterns), each input signal data being inputted to a neuron of the input layer. The data 10 also includes a set of teacher signal data 51 of (number of neurons of output layer)×(number of patterns), each teacher signal data being used for comparing therewith outputs from the neuron of the output layer to determine an error. These data sets 48 and 51 are stored in a pair manner and an input signal pattern 49 corresponds to an teacher signal pattern 52, for example.

FIG. 9 shows in detail the evaluation data set 11 indicating a state of the learning. The evaluation data set 11 includes the following data:

(1) A data element 53 representing an output error of the neural network;
(2) A data element 54 representing a mean value of norms of gradient vectors of output error with respect to the respective weights;
(3) A data element 55 representing a mean value of norms of weight vectors of respective neurons; and
(4) A data item 56 representing a mean value of derivatives of a sigmoid function with respect to (number of learning patterns)×(number of neurons). The four data elements 53 to 56 are stored in the table 11 for each evaluation data in a manner associated with a series of iterations of learning. These data elements are used not only to indicate the learning state to the user but also to determine whether or not the possibility of protraction of learning is high. Moreover, when a restoring operation is achieved, the data elements are stored in the table of case data 15 as a portion of case data set.

FIG. 10 shows in detail the reference value set 12 employed to judge a high possibility of the learning protraction. The reference value set 12 includes a reference value for the output error 53, a reference value 62 for the mean value of norms 54 of the steepest descent gradient vector, a reference value 63 for the mean value of norms of weight vectors 55, and a reference value 64 for the mean value of derivatives of sigmoid function 56. The judging condition includes the following four conditions:

(1) The output error 53 is larger than the reference value 61;
(2) The mean value of norms 54 of the gradient vector is smaller than the reference value 62;
(3) The mean value 55 of norms of weight vectors is larger than the reference value 63; and
(4) The mean value 56 of derivatives of sigmoid function is smaller than the reference value 64. When all the conditions are satisfied, the protraction of learning is determined to have occurred. However, when at least one of the four conditions is satisfied, the protraction may be determined to have occurred.

Figure 11:
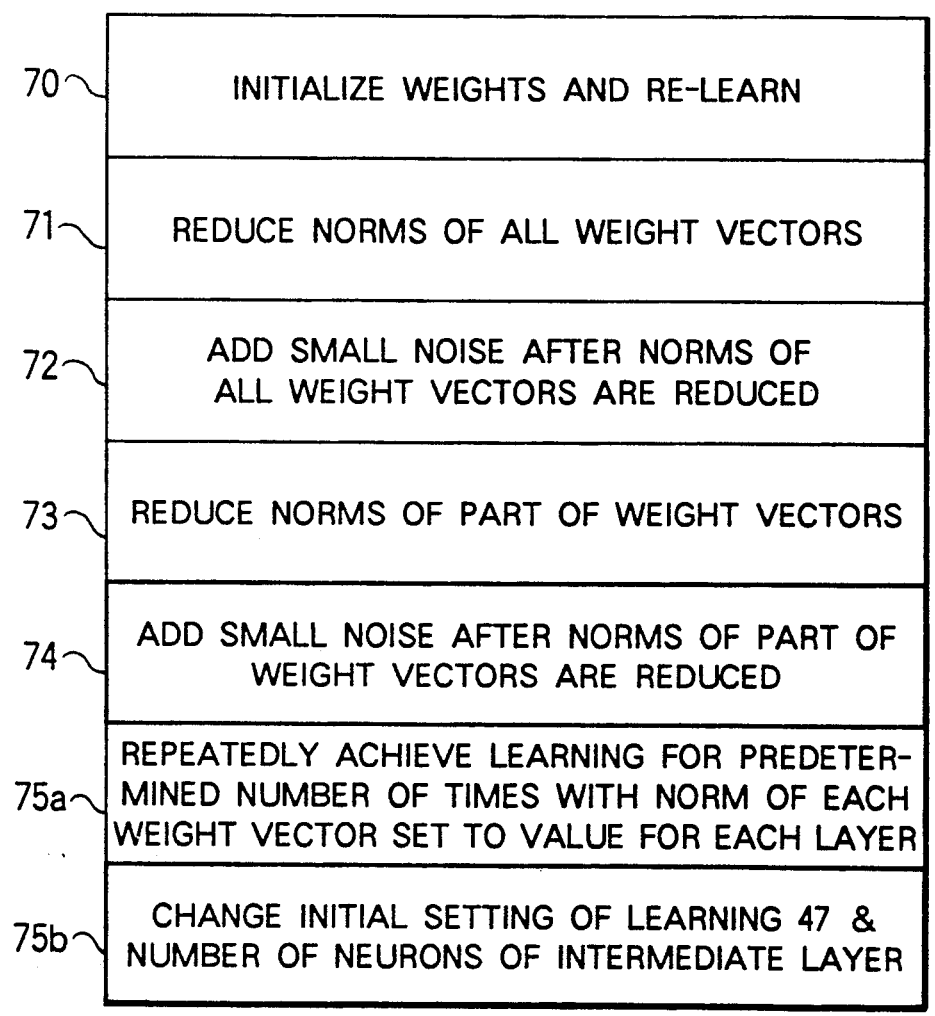
FIG. 11 is a diagram showing a list of restoring methods of FIG. 2.

FIG. 11 shows in detail the list of restoring methods 13 displayed by the learning auxiliary system 1 when the user determines restoration of the learning from the protraction. The list 13 includes a processing 70 to initialize weights and to achieve learning again, a processing 71 to reduce norms of all weight vectors (because the learning protraction takes place due to an excessive increase in norms), and a processing 73 to reduce norms of part of weight vectors related to the learning protraction. Processings 72 and 74 are implemented by adding a small noise to the processings 71 and 73, respectively. Processing 75a is adopted to repeatedly achieve the learning for a predetermined number of times with a norm of each weight vector set to a value for each layer. Processing 75b is disposed to restore the network from the protraction caused due to an inappropriate parameter setting and includes pocessing for increasing the number of neurons of an intermediate layer or to vary learning coefficients and the momentum coefficients.

FIG. 12 shows in detail the table of case data set 15 used in the past. The case data set 15 includes, for each case, a restoring method adopted to restore learning from conglutination in a past problem, a problem data set 9 for the past problem and an evaluation data set 11 obtained during learning of the past problem. When the user determines execution of a restoration processing on the current problem, the problem data set and the evaluation data set for the current problem are stored in the form of case data 77 or 78, as well as the adopted restoring method.

Figure 13:
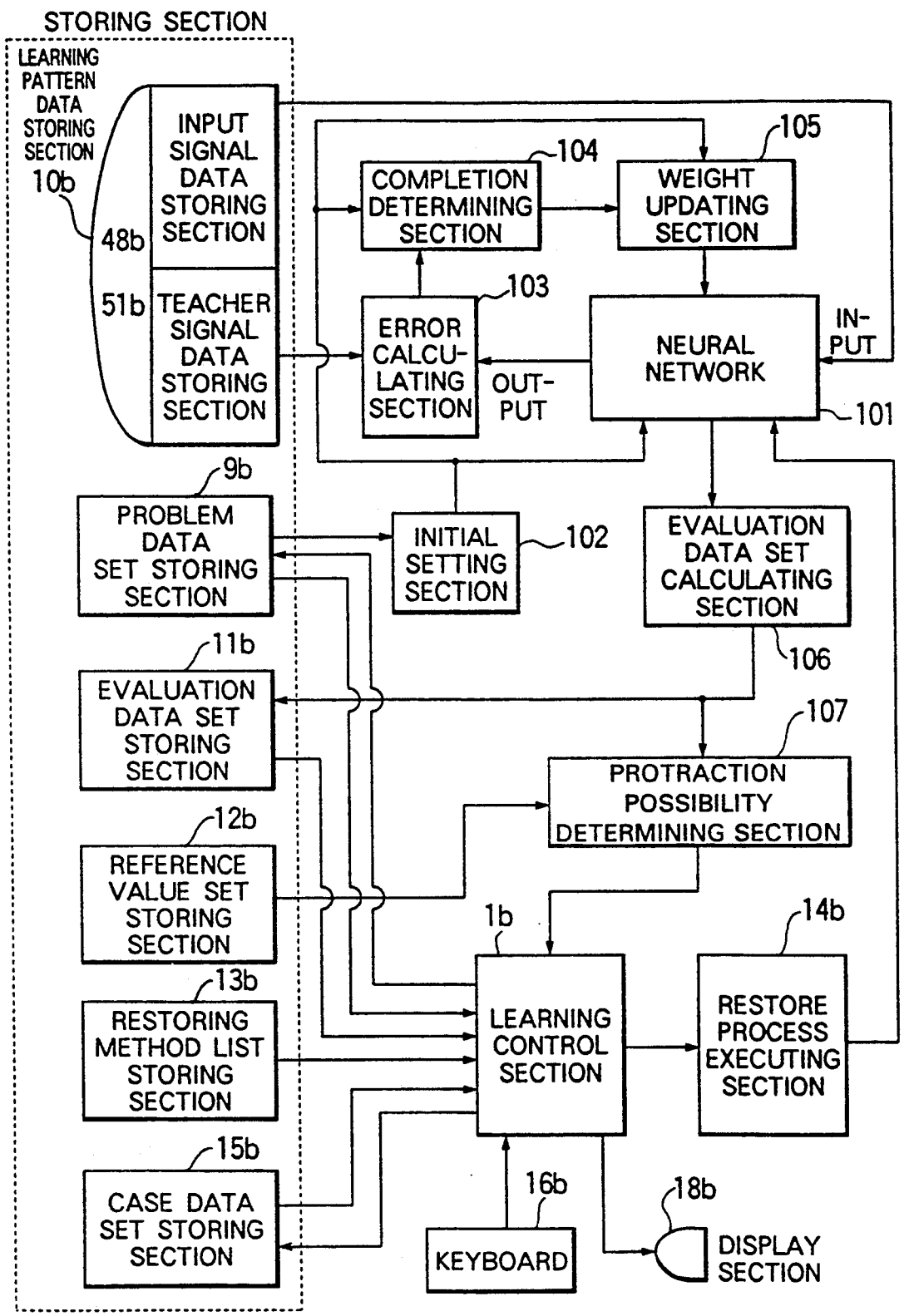
FIG. 13 is a diagram schematically showing an example of configuration of the learning control system shown in FIG. 2.
Figure 14:
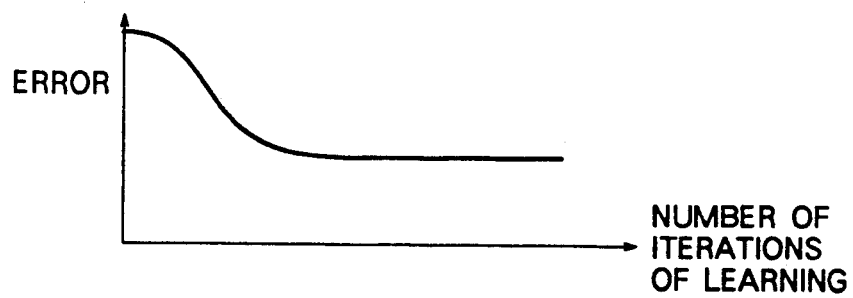
FIGS. 14A to 14D are graphs of data of the evaluation data table, respectively.
Figure 14:
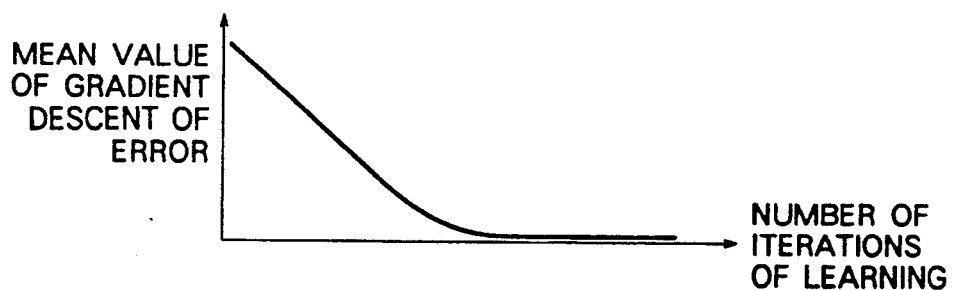
Figure 14:
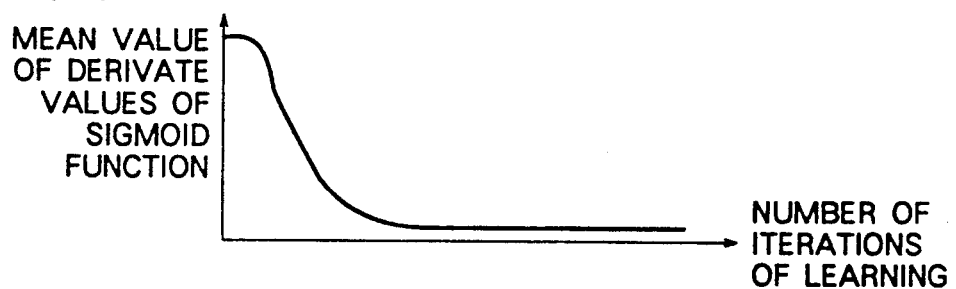
Figure 14:
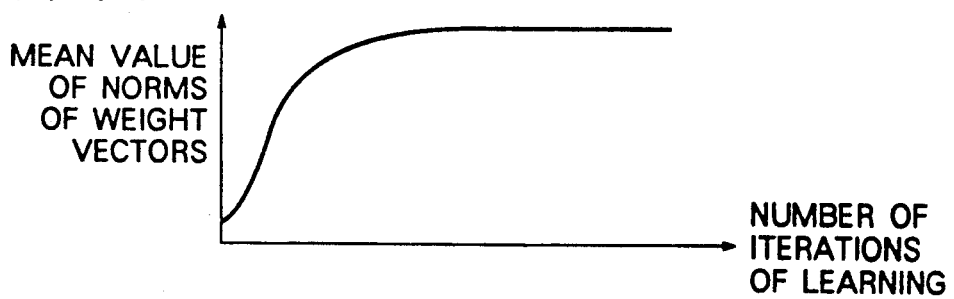
Figure 15:
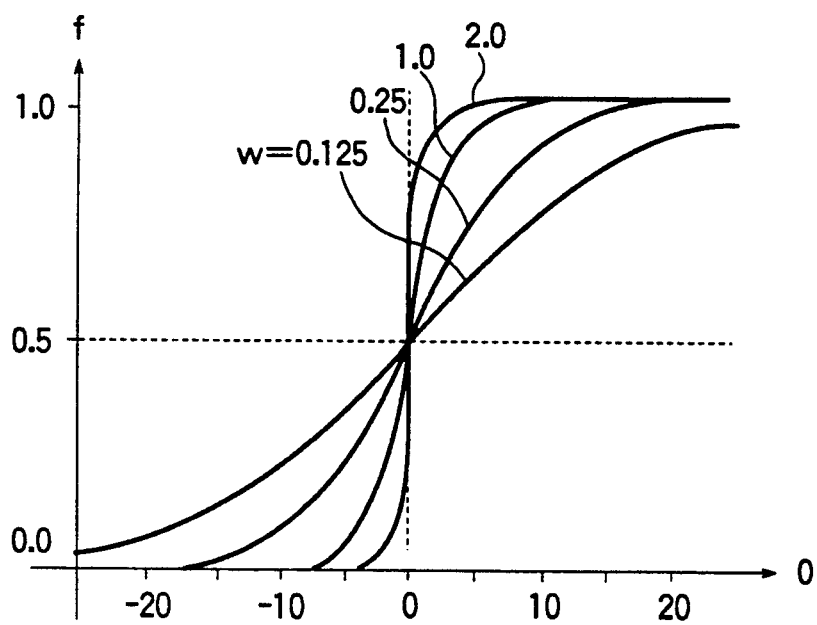
FIG. 15 is a graph showing dependency of a sigmoid function upon a weight w.
Figure 16:
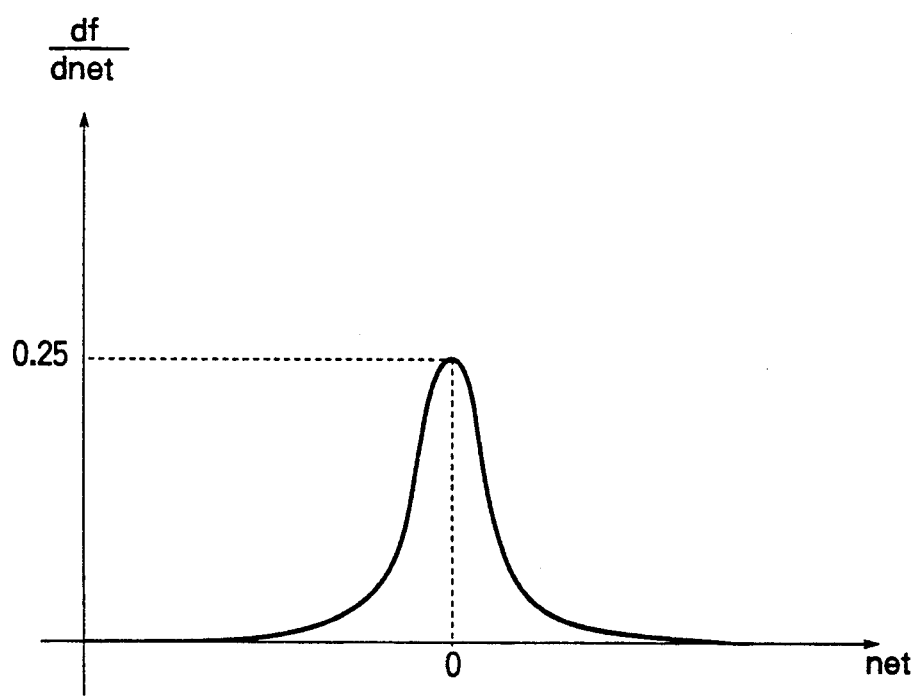
FIG. 16 is a graph showing derivative values of a sigmoid function.
Figure 17:
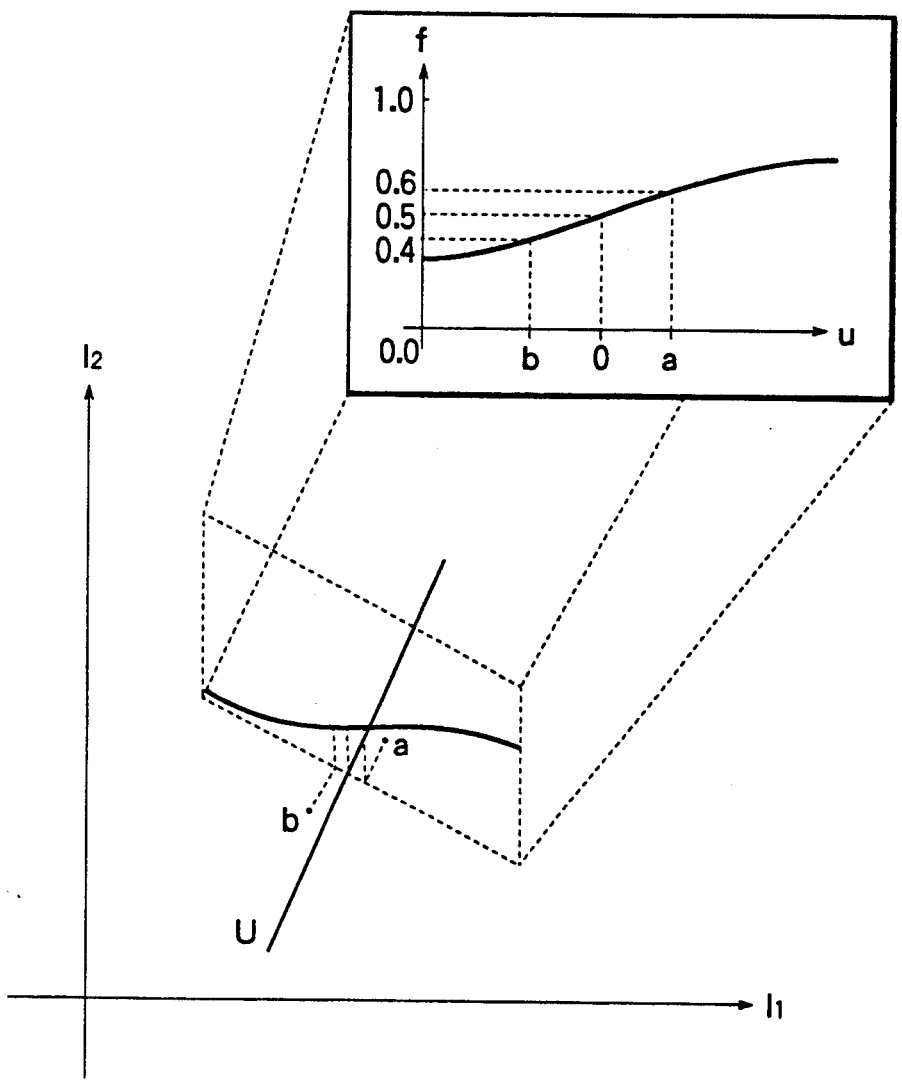
FIG. 17 is a diagram showing a state of a neuron prior to learning of separation of signals a and b.
Figure 18:
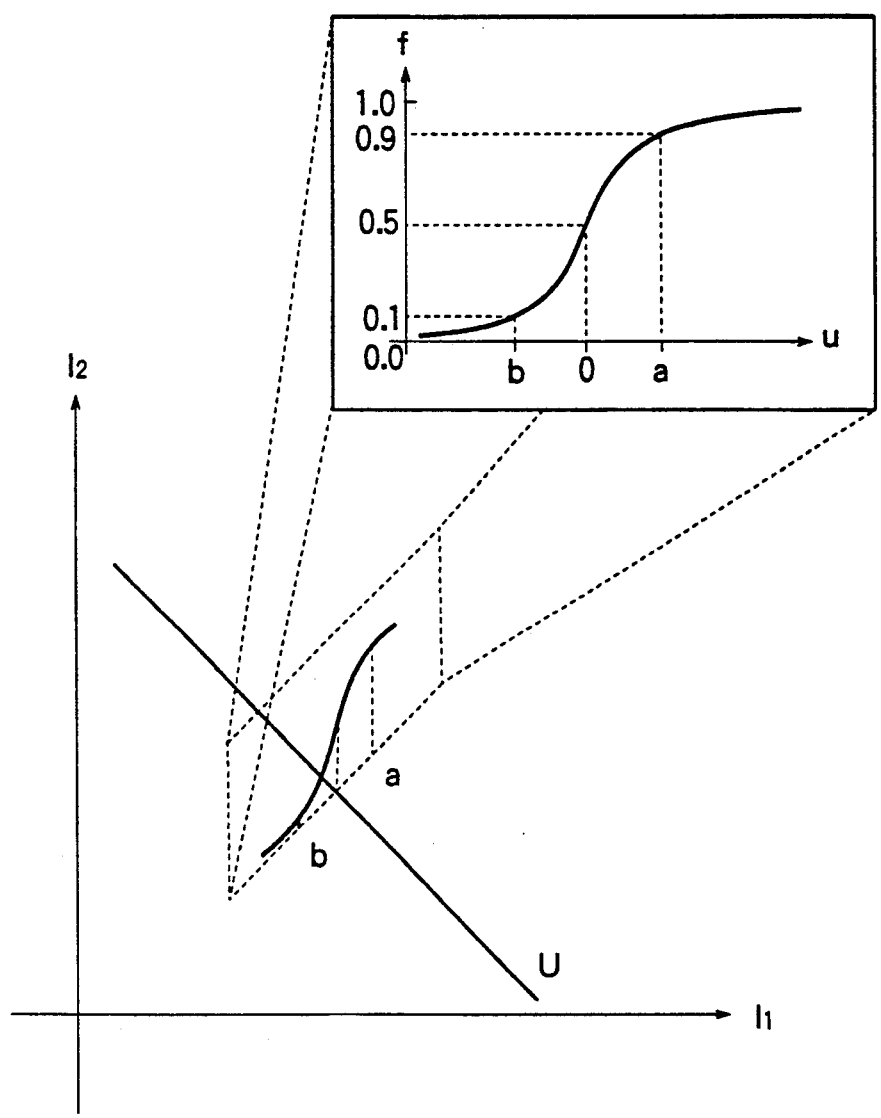
FIG. 18 is a diagram showing a state of the neuron after the learning.

FIG. 13 is an example of functional representation of the configuration described above. It is naturally to be understood that the configuration may be represented in other forms.

In the functional constitution of FIG. 13, a learning control system includes a storing section, a control section, and input/output section. The storing section is constituted of a learning pattern data storing section 10b, a problem data set storing section 9b, an evaluation data set storing section 11b, a reference value set storing section 12b, a restoring method list storing section 13b, and a case data set storing section 15b. The input/output section includes a keyboard 16b and a display section 18b. The control section is constituted of a completion determining section 104, a weight updating section 105, an error calculating section 103, a neural network 101, an initial setting section 102, an evaluation data set calculating section 106, a protraction possibility determining section 107, a learning control section 1b, and a restore process executing section 14b.

Figure 1:
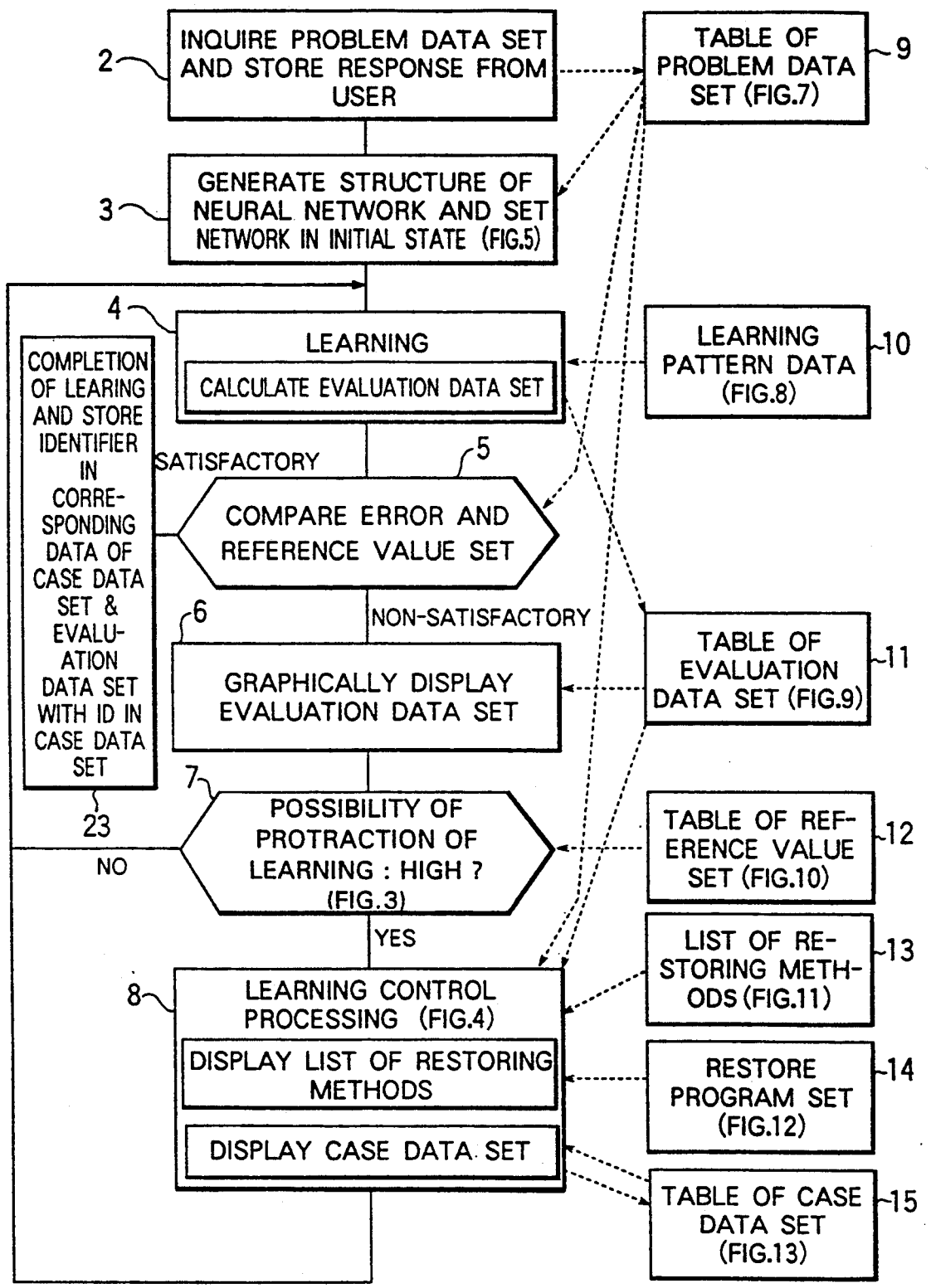
FIG. 1 is a schematic diagram showing the overall learning processing flow of a learning control system according to an embodiment of the present invention.

Referring next to FIG. 1, description will be given of the operation of the learning control system in a neural network system according to the present invention.

In this embodiment, when the proceeding of learning has almost been stopped while learning weights, several known restoring methods are displayed; moreover, the problem data set used in the past and the restoring methods related thereto are presented. Therefore, the user can reference the displayed data to select an appropriate restoring method to be executed by the learning control system.

In a step 2, before initiation of learning, the learning auxiliary system issues an inquiry to the user for the problem data set 9 of FIG. 7 so as to configure a neural network and to cope with occurrence of protraction of the learning. A response supplied thereto from the user is then stored in the table of problem data set 9.

Figure 5:
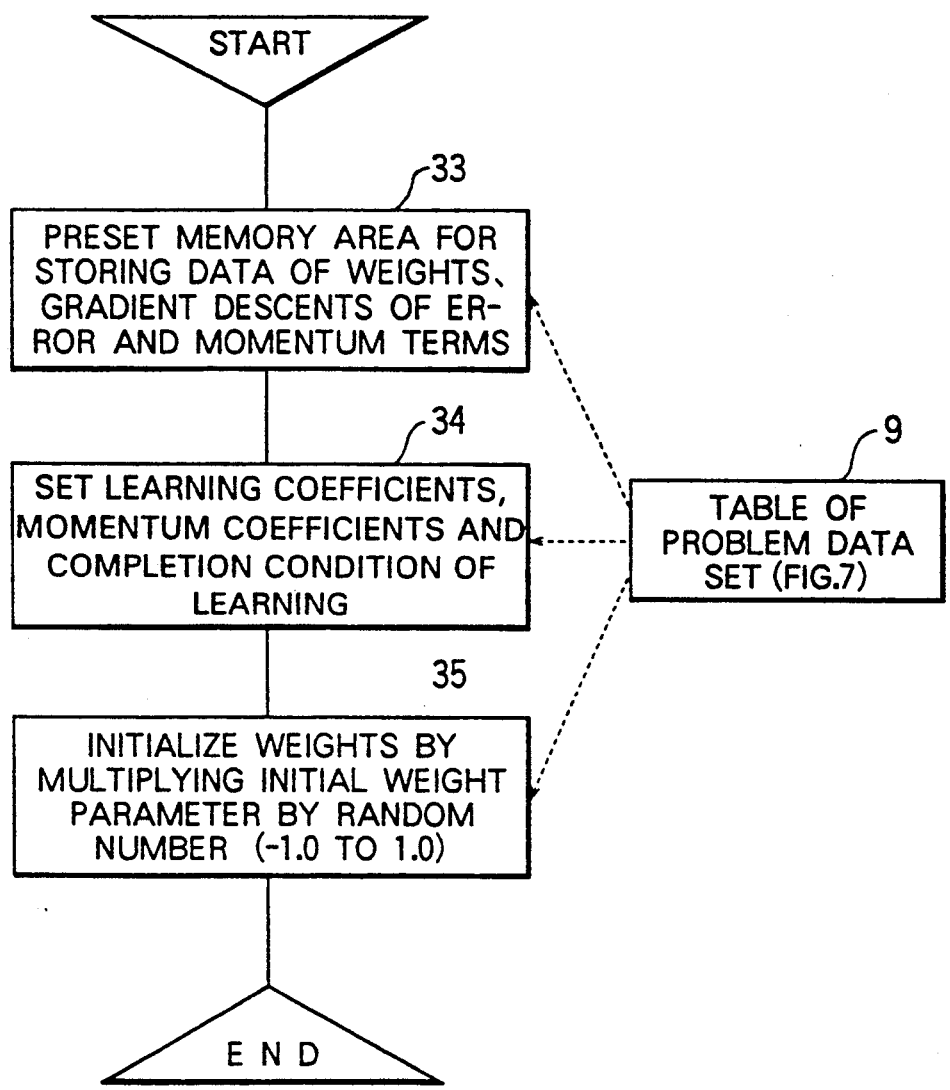
FIG. 5 is a flowchart showing in detail a step 3 of the processing flow of FIG. 1.

In a step 3, according to the response, the structure of the neural network is produced and an initial setup is achieved, e.g., initial weights are generated. Details of the step 3 will now be described by referring to FIG. 5. More specifically, in a step 33, by use of one 46 of the problem data set 9, there is reserved or preset a memory area necessary for generation of and learning in the network, i.e., an area for storing therein data representing weights of neurons, the steepest descent gradients of error, and momentum coefficients or term. In a step 34, parameters necessary for the learning, namely, the learning and momentum coefficients stored in the problem data set 9 are set to the learning program. In a step 35, the initial weight parameter of the problem data set 9 is multiplied by random numbers each ranging from +1 to −1 to generate initial weights. As a result of the processing of the step 3, the system is ready for initiation of the learning.

In the example shown in FIG. 13, the initial setting section 102 reads data related to the initial setting of learning from the problem data setting section 9b. Based on the read out data, the section 102 reserves in the neural network 101 a memory area necessary for generating a network and sets initial weights therein, establishes a completion condition of the learning in the completion determining section 104, and reserves in the weight updating section 105 a memory area necessary for the learning and sets therein parameters related to the learning. As a result of processing of this step, the system is ready for learning.

Figure 6:
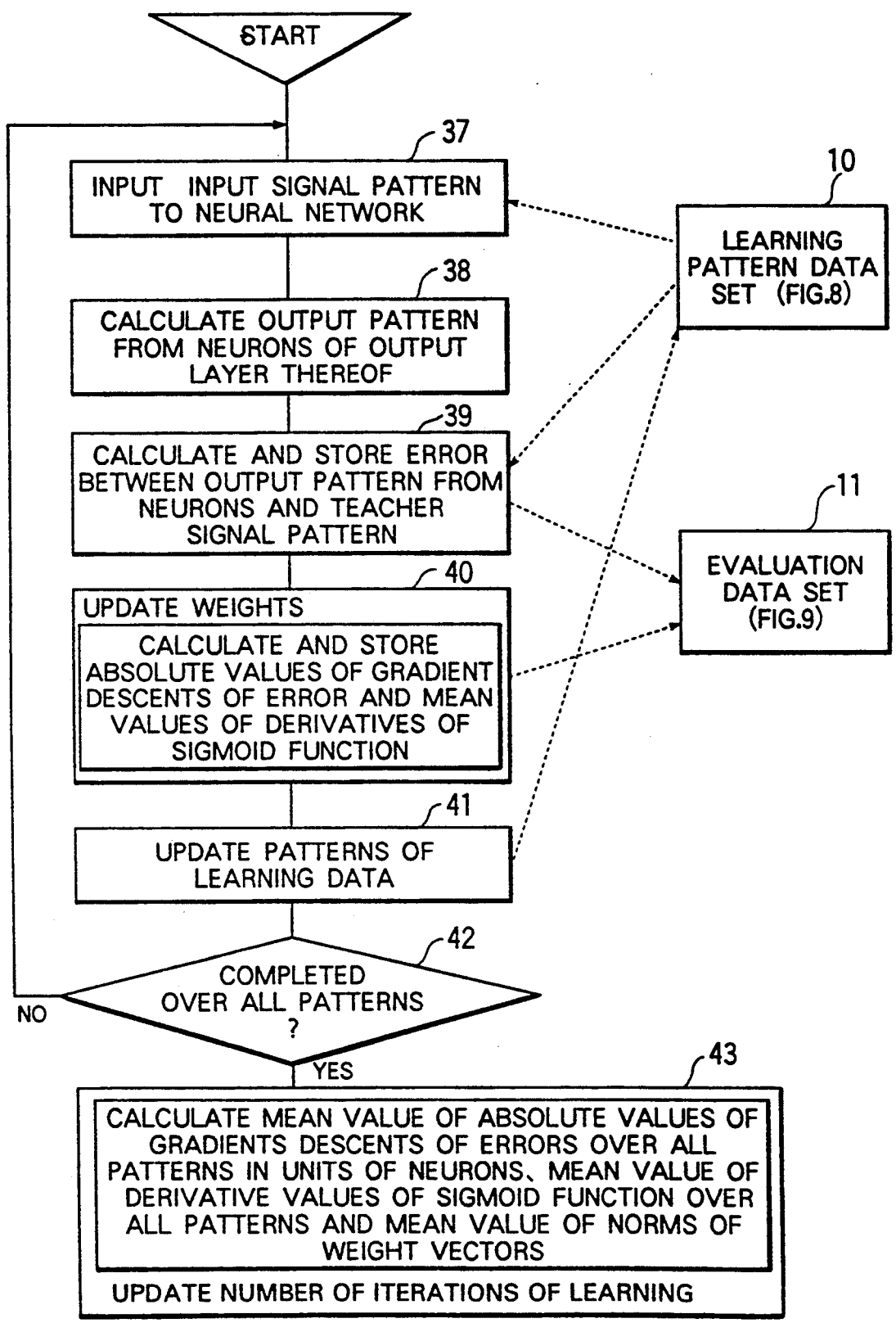
FIG. 6 is a flowchart showing in detail a step 4 of the processing flow of FIG. 1.

In the step 4, according to the back propagation method, the learning of weights is conducted. FIG. 6 shows in detail the processing of the step 4. In a step 37, an input signal pattern is taken out from the learning pattern data 10 and inputted to neurons of the input layer. In a step 38, using the equations (2) and (3), the system propagates the input signal pattern to a layer on the output side while transforming the pattern, thereby calculating an output pattern from the output layer. In a step 39, a difference is calculated between an output pattern from the respective neurons of the output layer thus computed in the step 38 and a teacher signal pattern of the learning pattern data 10 to calculate an error based on the expression (4). Subsequently, the error is added to the number of iterations of the learning in a pertinent row 53 of the evaluation data set 11. In a step 40, according to the expression (5), a derivative of error i.e. a gradient descent is calculated for each weight and then a correction amount of weight is computed in accordance with the equation (7) for each weight. The attained values are then added to the weights respectively associated therewith, thereby updating the weights. For the respective weights, mean values of mean values of norms of the steepest descent gradient vector and a mean value of derivative values of sigmoid function are then calculated (through division by the number of neurons). The resultant values are added to the contents of the pertinent iteration count of row 54 in the evaluation data set 11. In a step 41, the learning pattern o input signal pattern is updated for preparation of the subsequent learning.

In a step 42, a check is made to determine whether or not all the input signal patterns of the learning pattern data 10 have already been presented. If this is not the case, control is returned to the step 37; otherwise, the processing proceeds to a step 43. In the step 43, data respectively associated with the pertinent iteration count of a mean value of norms of the steepest descent gradient vector and data associated with the pertinent iteration count of the mean value 56 of derivative values of sigmoid function are divided by the number of learning patterns to obtain mean values to be stored in the original data areas respectively associated therewith. Moreover, mean values of norms of weight vectors are computed and stored in a data are of the mean value of norms 55 of weight vectors in the evaluation data set 11, the data area being respectively associated with the values of numbers of iterations. The number of iterations of learning is then incremented by one.

As a result of the execution of the step 4, learning is achieved for the input signal patterns of the learning pattern data 10. Furthermore, there are calculated the output error as a total of the output errors of all the input signal patterns, a mean value of mean values of norms of the steepest descent gradient vector (attained through a division by the number of input signal patterns), and a mean value of derivative values of sigmoid function (obtained through a division by the number of input signal patterns).

In an example of FIG. 13, learning of weights is accomplished by the neural network 101, the learning pattern data storing section 10b, the error calculating section 103, and the weight updating section 105. In addition, in the evaluation data set calculating section 106, the evaluation data set including data 53 to 56 shown in FIG. 9 are calculated. The results are sent to the protraction possibility determining section 107 and are stored in the evaluation data set storing section 11b at the same time.

In a step 5, a check is made to determine whether or not the error attained from the equation (4) is less than the upper limit of the error preset as reference of the completion of learning. If this is the case, the learning is completed in the step 23; otherwise, the control is passed to the next step. In the step 23, an identifier indicating the completion of learning is set to the associated case data.

In a step 6, evaluation data 53 to 56 are obtained from the evaluation data set 11 to be represented as a function with respect to the number of iterations of the learning, for example, in the form of a graph as shown in FIGS. 14A to 14D. Thanks to the represented graphs, the user can monitor the states of learning.

In the example of FIG. 13, learning, i.e., update of weights is performed by the neural network 101, the learning pattern data storing section 10b, the error calculating section 103, and the weight updating section 105. In addition, in the evaluation data set calculating section 106, the evaluation data set including data 53 to 56 shown in FIG. 9 are calculated. The obtained data are sent to the determining section 107 and stored in the storing section 11b at the same time. Subsequently, the completion determining section 104 judges whether or not the error satisfies conditions designated by the learning completion reference. If this is the case, the learning is completed; otherwise, the learning control section 1b reads the evaluation data set from the storing section 11b to display them in a graph in a display section 18b. Resultantly, the user can monitor the states of learning.

Figure 3:
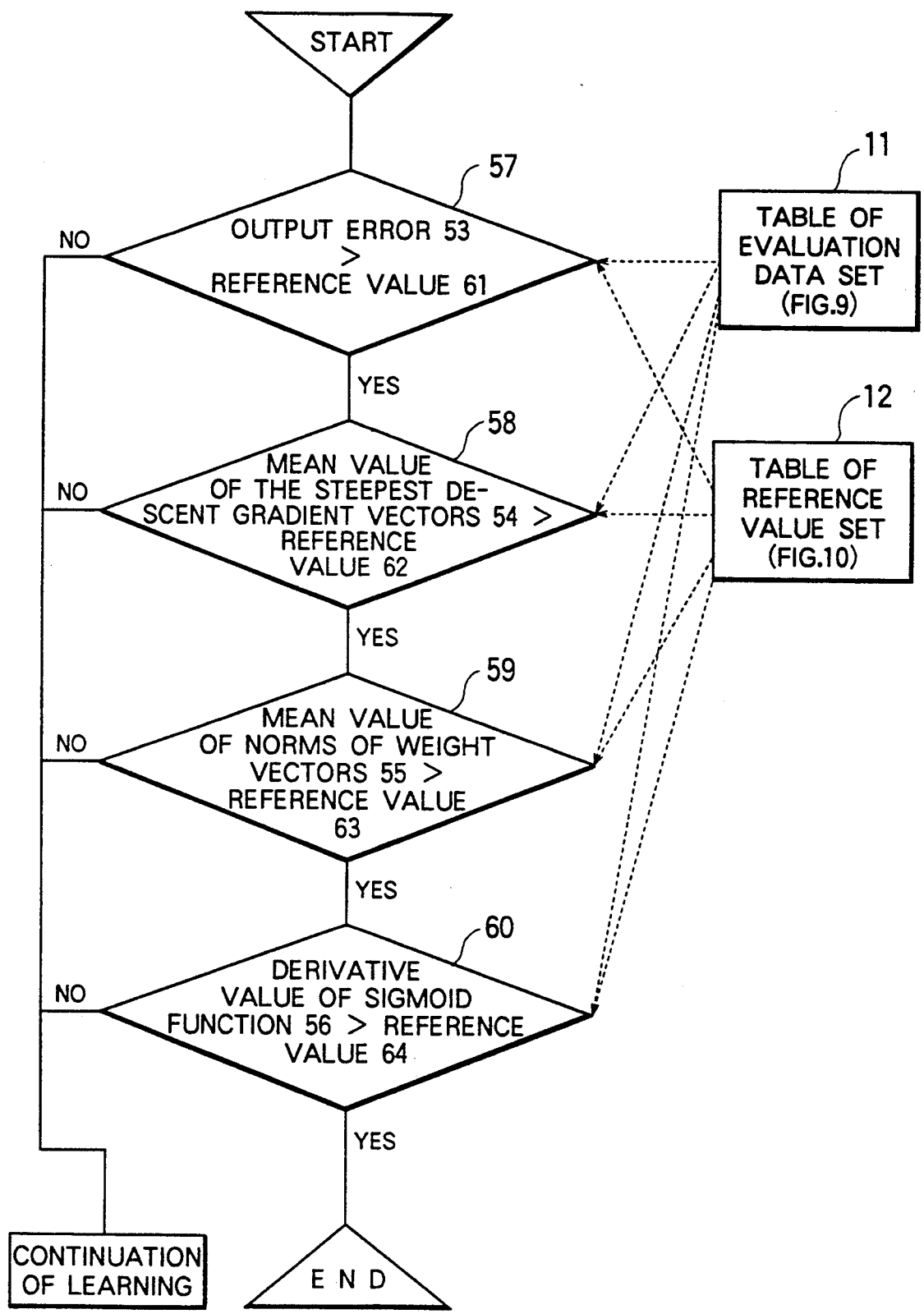
FIG. 3 is a flowchart showing in detail a step 7 of the processing flow of FIG. 1.

In a step 7, a check is made to determine based on the evaluation data set 11 whether or not there exists a high possibility of the learning protraction. The processing step 7 will be described in detail by referring to FIG. 3. In a step 57, if the output error 53 of the evaluation data set 11 is not greater than the reference value 61, the control is returned to the step 4 to continue learning; otherwise, the control proceeds to a step 58. In steps 58 to 60, the system performs operations similar to those above to attain the mean value of the steepest descent gradient vectors 54, the mean value of norms of weight vectors 55, and mean value of derivative values of sigmoid function 56. Finally, when the conditions are completely satisfied in the steps 57 to 60, the high possibility of the learning protraction is determined to complete the learning; otherwise, a low possibility thereof is determined to continue the learning.

In the example of FIG. 13, the protraction possibility determining section 107 reads the reference value set from the storing section 12b to compare data thereof with the evaluation data of the evaluation data set computed during the learning by the calculating section 106, thereby checking for the protraction of learning. If such a high possibility of the learning protraction is detected, a signal designating the high possibility is sent to the learning control section 1b; otherwise, the learning is continued.

In a step 8, an inquiry is issued to the user to determine whether the learning is to be continued or stopped. If the stop is selected, in order for the user to select a restoring method to be employed thereafter, not only the restoring method list 13 but also past restoring methods for past problems, past problem data sets for the past problems and past evaluation data set for the past problem are displayed.

Figure 4:
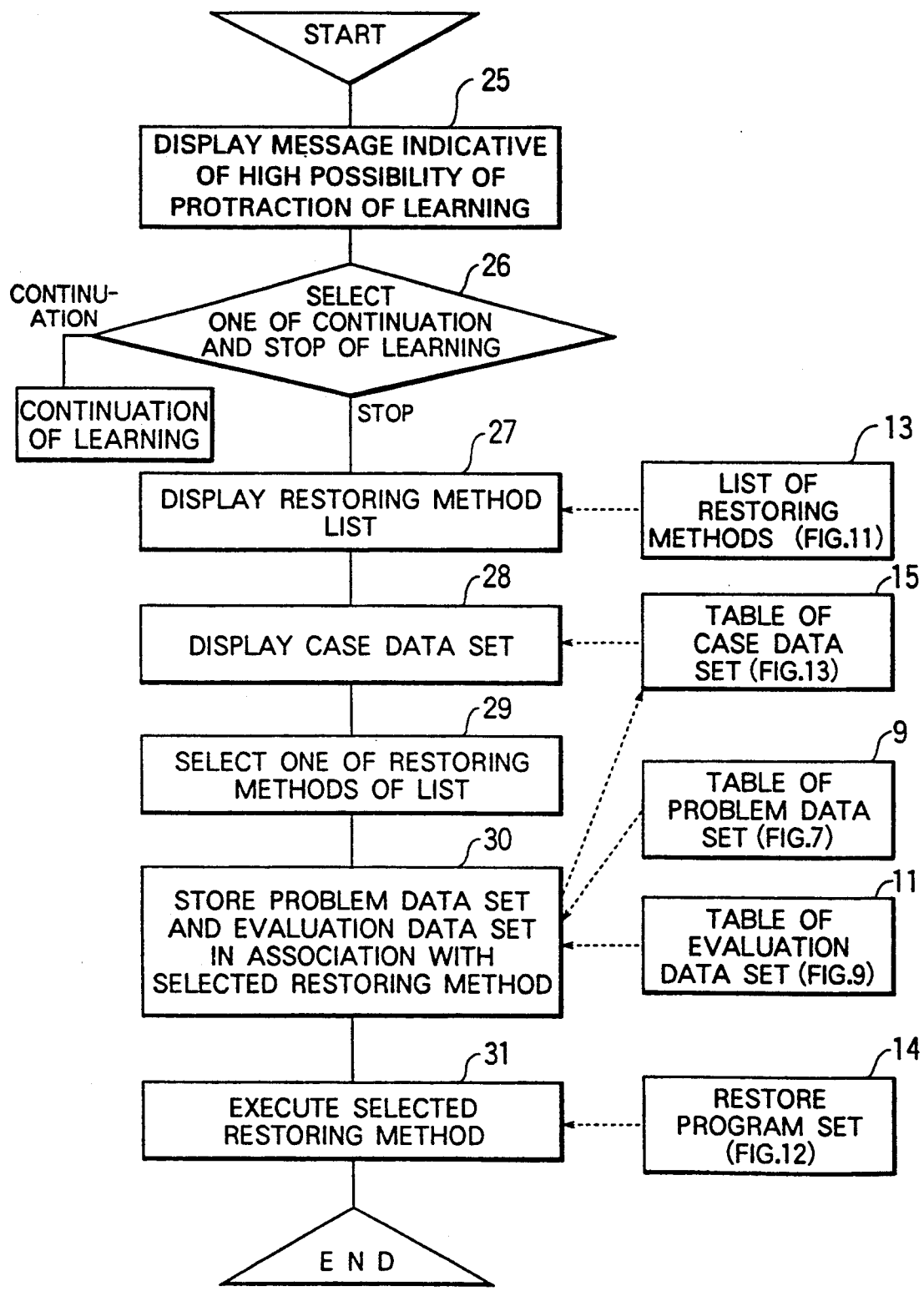
FIG. 4 is a flowchart showing in detail a step 8 of the processing flow of FIG. 1.

Referring now to FIG. 4, description will be given in detail of the processing of step 8. In a step 25, a message is displayed to indicate a high possibility of the learning protraction to the user. In a step 26, an inquiry is made to the user to determine whether or not the learning is to be stopped. If the learning is to be stopped, the control is passed to a step 27; otherwise, the learning is continuously achieved. In a step 27, the data 70 to 75 for the list of restoring methods 13 are displayed. In a step 28, there are presented data which are related to the current learning and which are stored in the case data set 15, namely, the restoring methods for the current problem, the past restoring methods adopted in the past problems similar to the current problem, the past problem data set and the past evaluation data set. In this operation, a symbol corresponding to an identifier denoting the completion of learning is also displayed. With this provision, the user can acquire information about the selected restoring method as well as the restoring methods for which learning has been completed. As a result of the processing of this step, the list of restoring methods 13 displayed in the step 27 for a selection of a restoring method is presented to the user. This helps user choose an appropriate restoring method. In a step 29, referencing the data displayed in the step 28, the user selects a restoring method from the list 13. In a step 30, the restoring method selected in the step 29, the problem data set 9 and the evaluation data set 11 are related to each other to be stored in the table of case data set 15. As a result of the processing of this step, the amount of case data of the past is increased. In a step 31, in order to execute the restoring method selected in the step 29, a pertinent program is called for execution thereof from the restore program set 14.

As a result of the processing of step 8, the user can reference the case data set of the past problem to select and to execute a restoring method, thereby to restore the learning from the protraction. At the same time, it is possible to relate the adopted restoring method, the problem data set 9 and the evaluation data set 11 to each other so as to store the data items thereof in the table of case data 15, thereby increasing the amount of case data set for the past problems. This enables the user to select a more appropriate restoring method in the subsequent restoration.

In the example of FIG. 13, the learning control section 1b issues an inquiry to the user to decide whether or not the learning is to be stopped. If the learning is to be stopped, in order for the user to select a restoring method thereafter, the restoring method list 13 as well as the restoring methods adopted for the past problems, the problem data set 9 provided for the past problems and the evaluation data set obtained in the past problems are displayed in the display section 18b. Referencing the data thus presented, the user selects a restoring method from the list read from the storing section 13b. The selected restoring method, and the problem data set 9 and the evaluation data set 11 for the current problem are related to each other to be stored in the case data set storing section 15b. As a result of the processing of this step, the amount of case data set is increased.

To execute the selected restoring method, a signal is delivered to the executing section 14b, thereby to achieve the restoring operation in the neural network 101.

The processing in the embodiment shown in FIG. 13 is similar to the above processing.

According to the present invention, since the restoring method is selected by referencing cases of the past, guidelines for the restoration can be easily prepared and the restoring becomes to be highly successful. In addition, the learning protraction can be detected at an early point of time and hence an appropriate restoring operation can be carried out. Consequently, unnecessary learning operations can be dispensed with. Therefore, in consideration of the overall period of time of learning including the restoration, the learning speed can be increased. It should be noted that the judgement of protraction of learning and the restoring method are not restricted by the embodiments above.

Subsequently, description will be given of an example in which the present invention is applied to character recognition.

A neural network used in this example includes 225 neurons in an input layer, 128 neurons in an intermediate layer, and 10 neurons in an output layer. As the input signal patterns, there are adopted 1000 patterns including 100 patterns of each of handwritten numerals 0 to 9, each numeral having a continuous gradation from 0 to 1. As teacher signal patterns, patterns are used in which a neuron of the output layer which corresponds to a numeral represented by an input signal pattern outputs "1", whereas other neurons each generate "0". Weights of neurons are initialized by use of random numbers ranging from −0.1 to 0.1 and the learning coefficients and the momentum coefficients are set to 0.01 and 0.9, respectively.

In an attempt of learning by a workstation (1.7 MFLOPS), the learning operation cannot be converged even after 39 hours from the initiation thereof. In this situation, to determine the learning protraction, there has been adopted a judging method according to the present invention in which the weights are reinitialized as a step of the restoring method. The overall period of learning inclusive of a learning period elapsed after the restoration is developed as 21 hours. Namely, according to the method, the learning period can be reduced to half that required in the system before. On the other hand, when another restoring operation (processing 71 to 75b of FIG. 11) is attempted, the overall learning period becomes to be 28 to 47 hours. In this case, the reduction of learning period of time is less than that attained when the weights are reinitialized. It is to be understood from the above results that when an appropriate restoring method is selected for a problem to be learned, the learning speed can be increased.

According to the present invention, the system displays an evaluation data set and then a message to the user to notify the learning protraction based on a judging condition for determining a possibility of the learning protraction, resulting in easy recognition of the learning protraction.

Moreover, when the user determines restoration of learning from the protraction, not only the list of restoring methods but also past restoring methods, past problem data set and past evaluation data set are displayed so that the user can reference the presented data to select an appropriate one of the restoring methods to be executed. This resultantly develops an advantageous effect that a more appropriate restoration processing can be conducted.

Furthermore, according to the present invention, as a result of the above processing, unnecessary learning operations can be dispensed with, resulting in a higher learning speed.

While particular embodiments of the invention have been shown and described, it will be obvious to those skilled in the art that various changes and modifications may be made without departing from the present invention in its broader aspects.

What is claimed is:

1. A method of managing learning in a neural network, comprising the steps of:
providing reference data representing criteria of protraction of the learning;
performing learning on a current problem by use of learning pattern data for learning cycles in accordance with a predetermined learning method while generating and updating evaluation data representing a learning state of the neural network for each learning cycle;
comparing the evaluation data with the reference data for each learning cycle;
judging in accordance with the compared result and predetermined judging conditions whether or not there exists a possibility of protraction of the learning;
displaying, when it is judged that there exists the possibility of the learning protraction, a list of learning methods for a user;
selectively displaying past evaluation data for each of past problems which is analogous to the current problem, a past learning data set for each of the past problems, and a learning method for each of the past problems employed when it was judged that there existed a possibility of learning protraction in the learning of each of the past problems;
selecting a new learning method from the list by a user based on the displayed past evaluation data, past learning data set and learning method, for each of the past problems, respectively; and
re-initiating the learning in accordance with the new learning method selected by a user.

2. A method according to claim 1, further comprising the steps of:
prior to the initiation of the learning, inputting the current problem, a learning method and a problem data set representing items associated with the problem; and
determining a structure of a neural network and initial weights for neurons of the neural network based on the problem and the problem data set and initializing the neural network by giving the neurons the weights to perform the learning.

3. A method according to claim 2, wherein said problem data set includes data representing a kind of the learning pattern data and characteristics thereof, and including:
data representing dimensions of input signal pattern data and teacher signal pattern data of the learning pattern data,
data representing the number of patterns in the learning pattern data,
data representing the number of patterns of the input signal pattern data paired with patterns of the teacher signal pattern data,
data representing a mean value of values of elements in each dimension of the input signal pattern data and the teacher signal pattern data,
data representing a standard deviation for the values of the elements in the dimension of the input signal pattern data and the teacher signal pattern data,
data representing that the learning pattern data is either binary data or continuous data, and
date representing whether or not the learning pattern data includes noise.

4. A method according to claim 1, wherein said comparing step further includes the step of displaying the evaluation data.

5. A method according to claim 1, wherein said evaluation data includes:
data representing an error of an output from the neural network,
data representing a means value of norms of steepest descent gradient vector for the respective weights of synapses in the neural network,
data representing a mean value of norms of weight vectors for each neuron, and
data representing a mean value of derivative values of a Sigmoid function over (number of patterns of the learning pattern data)×(number of neurons).

6. A method according to claim 1, wherein the predetermined judging conditions include:

a condition that an output error from the neural network is greater than a first reference value;

a condition that a mean value of norms of steepest descent gradient vectors for respective weights of synapses in the neural network is smaller than a second reference value;

a condition that a mean value of norms of weight vectors for each neuron is greater than a third reference value; and a mean value of derivative values of a Sigmoid function of each neuron over (number of patterns of learning pattern data)×(number of neurons) being greater than a fourth reference value.

7. A method according to claim 6, wherein said judging step includes the step of judging that there exists the possibility of the learning protraction when at least one of the predetermined judging conditions is satisfied.

8. A method according to claim 1, wherein said step of displaying a list of learning methods further comprises the steps of:

stopping the learning for selection by the user of whether the learning is to be continued or stopped, when it is judged that there exists the possibility of the learning protraction;

notifying the user that there is the possibility of the learning protraction when it is judged that there is the possibility of the learning protraction; and displaying the list of learning methods for selection of the new learning method by the user when the stopping of the learning is selected by the user.

9. A method according to claim 1, wherein the list of learning methods includes at least one of the methods of:

initializing the weights to re-initiate the learning;
reducing the norms of the weight vectors;
reducing the norms of the weight vectors and adding a small amount of noise to the weights;
reducing the norm of a portion of the weight vectors;
reducing the norm of a portion of the weight vectors and adding a small amount of noise to the weights;
fixing each of the norms for the weight vectors to one value for each layer and repeatedly performing the learning for a predetermined number of times; and
increasing the number of neurons of an intermediate layer or varying learning coefficients or momentum coefficients.

10. A method according to claim 1, further comprising the step of storing the new learning method and the evaluation data if the new learning method is selected by the user.

11. A method according to claim 10, further comprising the step of storing, in addition to the new learning method and the evaluation data, a particular identifier of the evaluation data when the re-initialed learning is completed.

12. A system for controlling learning in a neural network, comprising:

first storing means for storing a learning pattern data set;

second storing means for storing a reference data set;

third storing means for storing an evaluation data set;

fourth storing means for storing a list of restoring methods;

display means for displaying data inputted thereto;

learning means for reading out a current learning pattern data of the learning pattern data set for a current problem from said first storing means and performing learning of the current problem in the neural network according to the read out learning pattern data;

protraction determining means for reading a current reference data of the reference data set from said second storing means, storing, as an element of the evaluation data set in said third storing means, current evaluation data indicative of a learning state of a neural network and obtained during the learning, and determining whether or not there exists a possibility of protraction of the learning, in accordance with the read out current reference data, the obtained evaluation data and a predetermined judging condition set;

selection auxiliary means for respectively reading the current evaluation data and the list of restoring methods from said third and fourth storing means when it is determined that there exists the possibility of the learning protraction and outputting the read out current evaluation data and the read out list of restoring methods to said display means for selection of a particular restoring method by a user;

learning control means for controlling said learning means to perform the learning of the current problem in accordance with the particular restoring method designated by the user, when it is determined that there exists the possibility of the learning protraction; and fifth storing means for storing a case data set indicating past cases, the case data set including a particular restoring method adopted for a past learning that encountered a problem similar to the current problem, and a past evaluation data set employed in the past learning, wherein said selection auxiliary means further comprises means for storing in said fifth storing means, as new case data of the case data set, the selected restoring method and the evaluation data set.

13. A method of controlling learning on a current problem in a neural network, comprising the steps of:

initiating the learning of the current problem in accordance with learning pattern data;

judging whether or not there exists a possibility of protraction of the learning, in accordance with current evaluation data obtained during the learning, a reference data set, and a predetermined judging condition set, each current evaluation data representing a state of the learning in the neural network;

displaying a selection auxiliary data and a list of restoring methods for the user to select the particular storing method when it is judged that there exists the possibility of the learning protraction;

re-initiating the learning in accordance with the particular restoring method selected by the user;

wherein the step of displaying includes displaying past evaluation data for each of past problems which is analogous to the current problem, a past learning data set for each of the past problems, and a new learning method for each of the past problems employed when it was judged that there existed a possibility of the learning protraction in learning each of the past problems, respectively.

14. A method according to claim 13, further comprising the step of adding as new case data the particular restoring method and the obtained evaluation data set to the selection auxiliary data.

15. A method according to claim 14, further comprising the step of adding a particular identifier indicating success of the learning to the new case data.

* * * * *